(12) United States Patent
Takano et al.

(10) Patent No.: US 6,745,972 B2
(45) Date of Patent: Jun. 8, 2004

(54) METHOD OF WINDING SKEWED ARMATURE AND DEVICE THEREFOR

(75) Inventors: Tadashi Takano, Shuuchi-gun (JP); Susumu Ando, Shuuchi-gun (JP); Yoshio Kato, Komaki (JP)

(73) Assignee: Kabushiki Kaisha Moric, Mori-machi (JP)

( * ) Notice: Subject to any disclaimer, the term of this patent is extended or adjusted under 35 U.S.C. 154(b) by 0 days.

(21) Appl. No.: 10/064,544

(22) Filed: Jul. 25, 2002

(65) Prior Publication Data

US 2003/0085313 A1 May 8, 2003

(30) Foreign Application Priority Data

Aug. 3, 2001 (JP) ........................................ 2001-235685

(51) Int. Cl.$^7$ ............................................ H02K 15/085
(52) U.S. Cl. ................ 242/432.2; 242/434.7; 242/444.2; 29/605
(58) Field of Search ............................ 242/432.2, 432.3, 242/432.4, 445.1, 447.1, 434.7, 444.2

(56) References Cited

U.S. PATENT DOCUMENTS

| | | | | |
|---|---|---|---|---|
| 2,573,976 A | * | 11/1951 | Linders | 242/432.3 |
| 3,081,043 A | * | 3/1963 | Morrill | 242/432.4 |
| 3,995,785 A | * | 12/1976 | Arick et al. | 242/432.4 |
| 4,601,432 A | * | 7/1986 | Sedgewick | 242/433 |
| 4,712,028 A | * | 12/1987 | Horber | 310/49 R |
| 4,760,576 A | * | 7/1988 | Sako | 714/755 |
| 4,933,584 A | * | 6/1990 | Harms et al. | 310/162 |
| 5,760,520 A | * | 6/1998 | Hasebe et al. | 310/261 |

* cited by examiner

Primary Examiner—Emmanuel Marcelo
(74) Attorney, Agent, or Firm—Ernest A Beutler

(57) ABSTRACT

Two embodiments of winding methods and apparatus for winding coils of a rotating electrical machine where the armature teeth are skewed. The winding mechanism and method operates so that the winding needle does not have to enter to the bottom of the slots between the pole teeth but the wire is wound around the pole teeth from one end thereof with an arrangement for causing the windings to progressively move down the pole teeth as the winding continues.

8 Claims, 7 Drawing Sheets

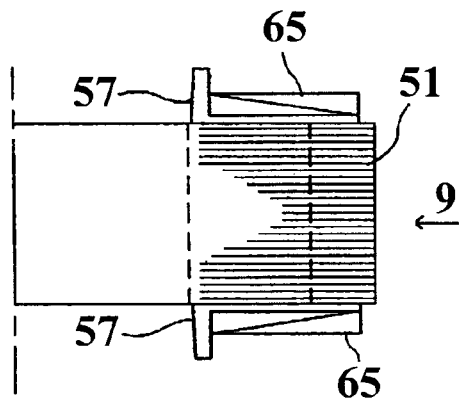
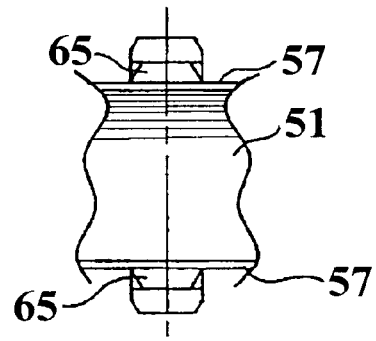
FIG. 8                FIG. 9
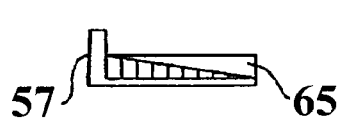
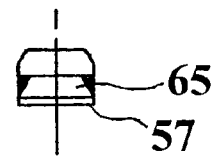
FIG. 10              FIG. 11
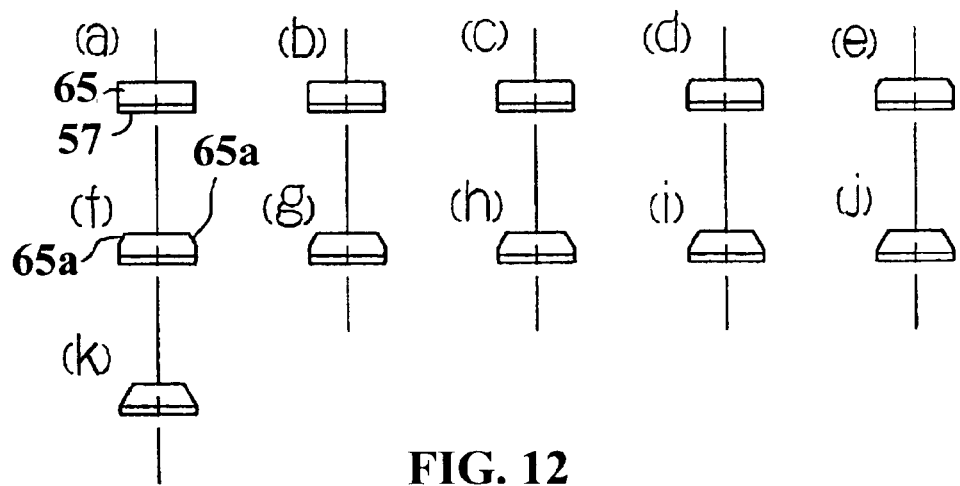
FIG. 12

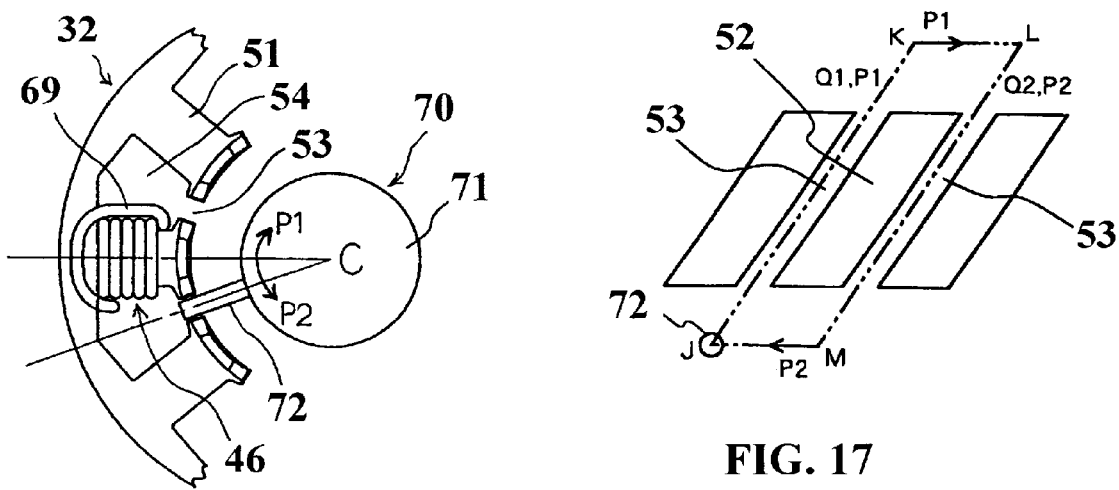
FIG. 18
FIG. 17
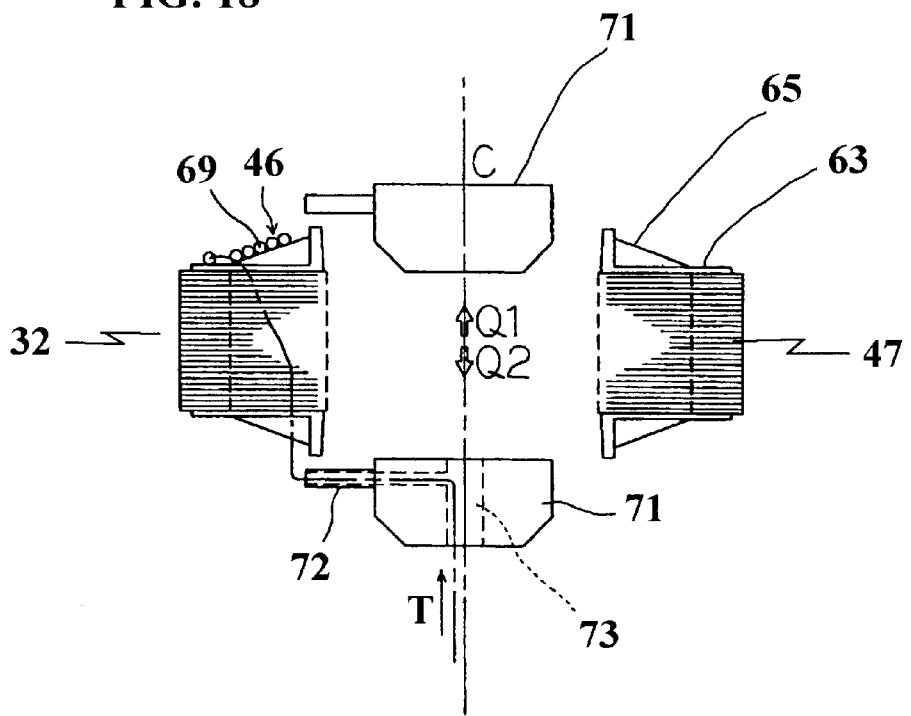
FIG. 19

METHOD OF WINDING SKEWED ARMATURE AND DEVICE THEREFOR

BACKGROUND OF INVENTION

This invention relates to a method of winding armatures for revolving-field electrical machines and more particularly to an improved winding method that permits a greater coil density to be obtained and avoids the likelihood of damaging the wire by the winding needle during the winding operation and also coils that are wound around skewed pole teeth.

Various methods have been employed for forming the coil windings for the armature of rotating electrical machines such as motors or generators. Generally these winding methods result in somewhat complicated structures and structures wherein the maximum coil densities are not capable of being obtained. Several of these methods involved passing a needle in the slot between the extending cores of the armature and then having that needle circumscribe the individual cores so as to form the windings. Because of the fact that the needle must be passed in the space between the cores, room must be left for it and this decreases the coil density.

In addition, there is a likelihood that the needle may engage already wound coils and damage them particularly by removing their insulation. These various prior art methods are described in full detail in the co-pending application assigned to the Assignee hereof, entitled "Stator Coil Structure For Revolving-Field Electrical Machine and Method Of Manufacturing Same", application Ser. No. 09/683764, filed Feb. 12, 2002.

Even greater difficulties arise when the pole teeth and interposed slots are skewed relative to the axis of rotation of the associated machine. This expedient of skewing the pole teeth is frequently done to prevent cogging generated when the magnets opposed to the plural magnet pole teeth disposed side by side pass between the magnet pole teeth. Conventional winding machines do not permit the winding needle to traverse the pole teeth because of the skewed teeth and slots. If this were to be attempted the pole teeth would interfere with the path of the winding needle. Because of this such coils have been manually wound thus increasing the machine cost.

It is, therefore, a principle object of this invention to provide an automatic winding method and apparatus for winding the coils on a rotating electrical machine having skewed armature teeth.

It is a further object of this invention to provide such a method and apparatus where the coil density can be substantially increased by keeping the winding needle substantially out of the slots between the teeth during the winding operation.

SUMMARY OF INVENTION

A first feature of this invention is embodied in a method of winding the coils of a rotating electric machine comprising a circular core of a magnetic material and a plurality of magnetic pole teeth extending radially from the circular core wherein each of the magnetic pole teeth defining a core and slots formed between adjacent magnetic pole teeth. Each of the slots defines a mouth formed between adjacent outer ends of the cores. The pole teeth and the slots are skewed relative to the axis of rotation of the rotating electric machine so that the slots have the shape of a parallelogram in a developed plan view. The winding method comprising the steps of positioning a threading needle having an opening through which the wire for winding the coils is fed in proximity to one of the mouths. Relative movement of the needle and pole tooth is caused to effect movement of the needle opening in a path around one of the pole teeth at one side of slot without moving the needle in any substantial distance along the length of the one pole tooth to form a first winding. The relative movement of the needle and pole tooth is continued to effect movement of the needle opening in a path around one of the pole teeth at one side of slot without moving the needle in any substantial distance along the length of the one pole tooth to form succeeding windings each of which moves the previous winding along the pole tooth toward the circular core without requiring movement of the needle in any substantial distance along the length of the one pole tooth so that the needle need not be moved any substantial distance into the slot.

A further feature of the invention is adapted to be embodied in an apparatus for performing the aforenoted method. This apparatus comprises a threading needle having an opening through which the wire for the winding the coils is fed in proximity to one of the mouths. A support supports the circular core. A drive operates the support and said winding needle being for effecting relative movement of the needle and pole tooth to effect movement of the needle opening in a path around one of the pole teeth at one side of slot without moving the needle in any substantial distance along the length of the one pole tooth to form a first winding and continuing the relative movement of the needle and pole tooth to effect movement of the needle opening in a path around one of the pole teeth at one side of slot without moving the needle in any substantial distance along the length of the one pole tooth to form succeeding windings each of which moves the previous winding along the pole tooth toward the circular core without requiring movement of the needle in any substantial distance along the length of the one pole tooth so that the needle need not be moved any substantial distance into the slot.

BRIEF DESCRIPTION OF DRAWINGS

FIG. 8 is a cross sectional view of one of the poll teeth of this embodiment with the coil winding removed.

FIG. 9 is a partial end elevational view taken in the direction of the arrow 9 in FIG. 8 but again not showing the skewing of the pole teeth.

FIG. 10 is a cross sectional view of the upper bobbin half taken along the same plane as FIG. 8.

FIG. 11 is an end elevational view looking in same direction as FIG. 9.

FIGS. 12a–12k are a series of cross sectional views taken at equal intervals along the length of FIG. 8 starting at the base of the pole tooth (left hand side) and ending at the tip (right hand side) thereof.

FIG. 17 is a graphical view, in part similar to FIG. 14, but shows a winding apparatus and method in accordance with another embodiment of the invention.

FIG. 18 is a partial top plan view, in part similar to FIG. 15, and shows the apparatus and method for this embodiment.

FIG. 19 is a side elevational view, in part similar to FIG. 16, showing the construction of this embodiment.

DETAILED DESCRIPTION

Figure 1:
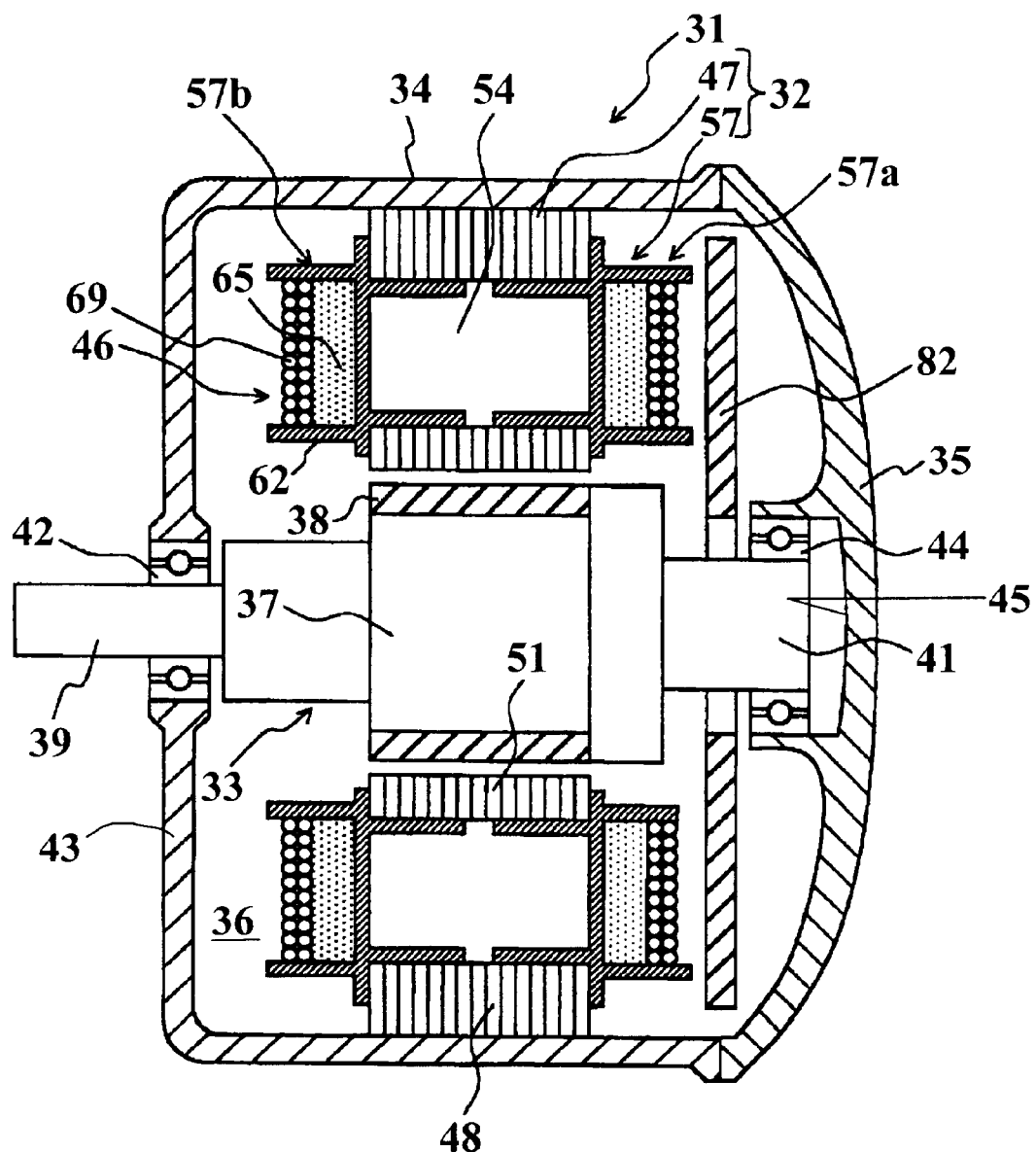
FIG. 1 is a cross sectional view taken through a rotating electrical machine formed by a method and apparatus in accordance with one embodiment of the invention.

Referring now in detail to the drawings and initially to the embodiment shown in FIGS. 1 through 16, with primary reference first to FIG. 1, a rotating electric machine constructed in accordance with the invention is identified generally by the reference 31. The rotating electric machine 31 may be either an electric motor or a generator depending upon the desired application.

The rotating electrical machine 31 is comprised of a stator assembly, indicated generally by the reference numeral 32, and a rotor assembly, indicated generally by the reference numeral 33. These components are contained within a housing assembly that is comprised of a cup shaped, main housing piece 34 and a cover plate 35, which is suitably attached thereto to form an enclosure 36 in which the stator assembly 32 and rotor assembly 33 are positioned.

The rotor assembly 33 is formed with a central portion 37 on which a plurality of circumferentially spaced permanent magnets 38 having alternating polarity are affixed in a known manner. The end portions of the rotor assembly 33 comprise shaft portions 39 and 41 that are journalled, respectively, in bearings 42 carried by an integral closure wall 43 of the cup shaped, main housing piece 34 and bearings 44 carried in a recessed portion 45 of the cover plate 35.

The construction of the rotor assembly 33 may be deemed to be of the general conventional type and any type known in this art might be employed. Also, although the described machine employs an arrangement wherein a coil winding assembly, indicated generally by the reference numeral 46 is provided on individual armature poles, to be described, formed on the stator assembly 32, it should be understood that the coil winding assembly 46 can be mounted on the rotor assembly 33 and the permanent magnets 38 may be mounted as part of the stator assembly including the cup shaped, main housing piece 34.

Figure 2:
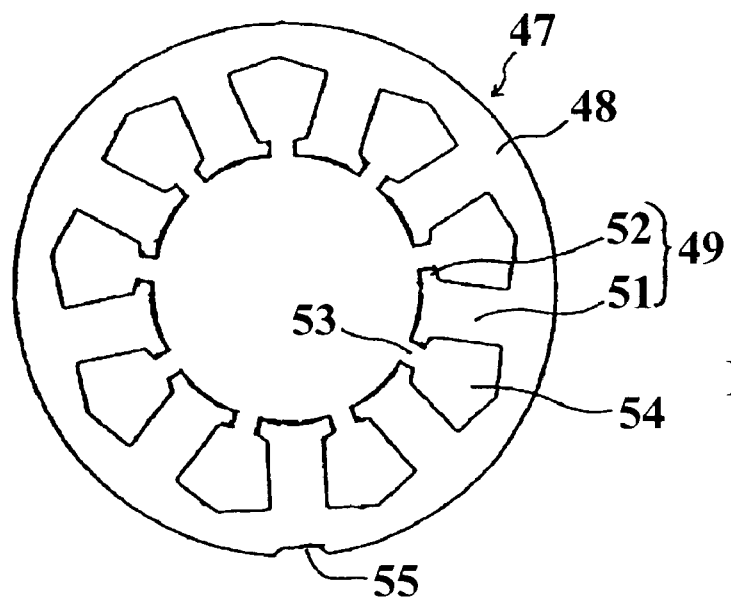
FIG. 2 is an end elevational view of the laminations of the magnetic core looking from one side but not showing the skewing of the pole teeth.
Figure 3:
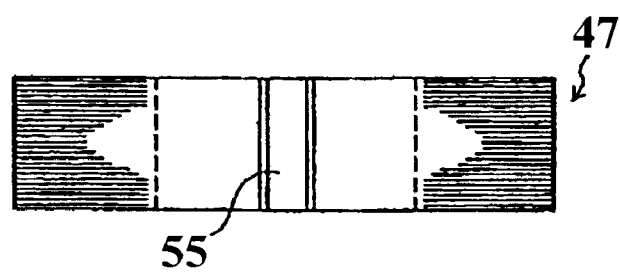
FIG. 3 is a side elevational view of the core.
Figure 4:
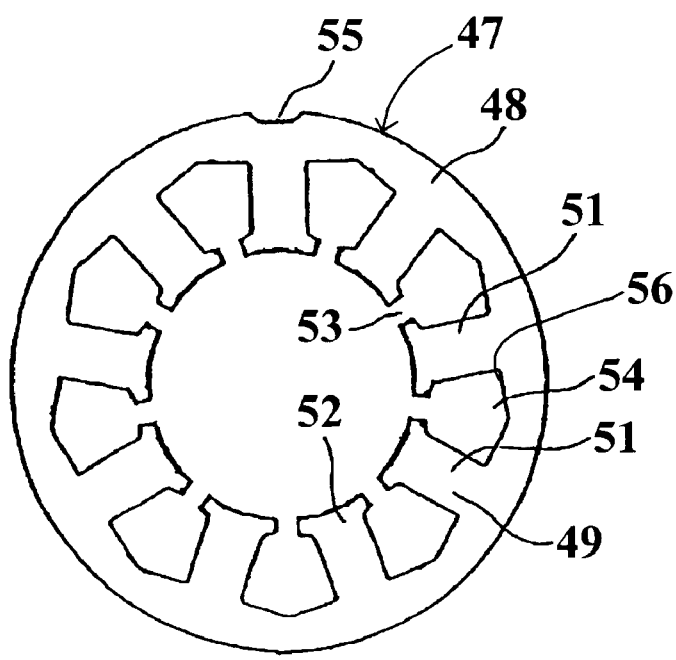
FIG. 4 is end elevational view of the core looking in the opposite direction from FIG. 2 but again not showing the skewing of the pole teeth.

The stator assembly 32 is comprised of an armature core, indicated generally by the reference numeral 47, which is made up of a plurality of laminated armature plates as shown in FIGS. 2 through 4. In this embodiment, since the armature core 47 is the outer element of the rotating electric machine 31, it is comprised of a circular core portion 48 from which a plurality of pole teeth, each indicated generally by the reference numeral 49, extend.

The pole teeth 49 are skewed relative to the axis of rotation C of the rotor shaft 37 have generally parallelogram shaped portions 51 (see particularly FIG. 13) that extend outwardly from the circular core portion 48 and which terminate in enlarged, projecting parallelogram shaped ends 52. This skewing of the teeth 49 is done to reduce cogging.

Parallelogram shaped gaps 53 (again see particularly FIG. 13) are formed between adjacent ends of these projecting ends 52, which form the outer termination of slots 54, formed between adjacent pole teeth 49. The parallelogram shape of the teeth 51, projecting ends 52 gaps 53 and slots 54 is not shown in FIGS. 3–12 to simplify these figures. As will be noted shortly this In order to assist in the alignment of the lamination of the core pieces of the armature core 47, each of them is formed with a reference slot 55 on the outer periphery of their circular portion 48. This slot 55 assists in alignment as well as location within the cup shaped, main housing piece 34. Successive of the core laminations are rotated slightly relative to each other about the axis C to achieve the skewing shown in FIG. 13.

The ends of the slots 54 adjacent the circular portion 48 of the armature core 47 is defined by angularly disposed surfaces 56 formed on opposite sides of the bases of each of the pole teeth 49. These act as projections that cooperate with the projecting ends 52 at the outer ends of the teeth 49 so as to assist in locate an insulating bobbin forming members 57 around which the coil winding assembly 46 is formed as well as locating the individual windings themselves.

The insulating bobbin forming members 57 are comprised of right and left hand sections 57a and 57b, which have a substantially identical construction, except as will be hereinafter described. Like the armature core 47, the insulating bobbin forming member 57 is comprised of a circular portion 58 that has an L-shaped cross section and from which extend individual legs 59 of a generally U-shape which is skewed so as to be complimentary to and snuggly received on the core pole teeth 49. Inclined surfaces 60 at the base of these legs 59 cooperate with the aforenoted angularly disposed surfaces 56 formed at the outer ends of the pole teeth 49 so as to provide a stop or abutment against which the coil windings actually engage. This construction also facilitates alignment.

Figure 5:
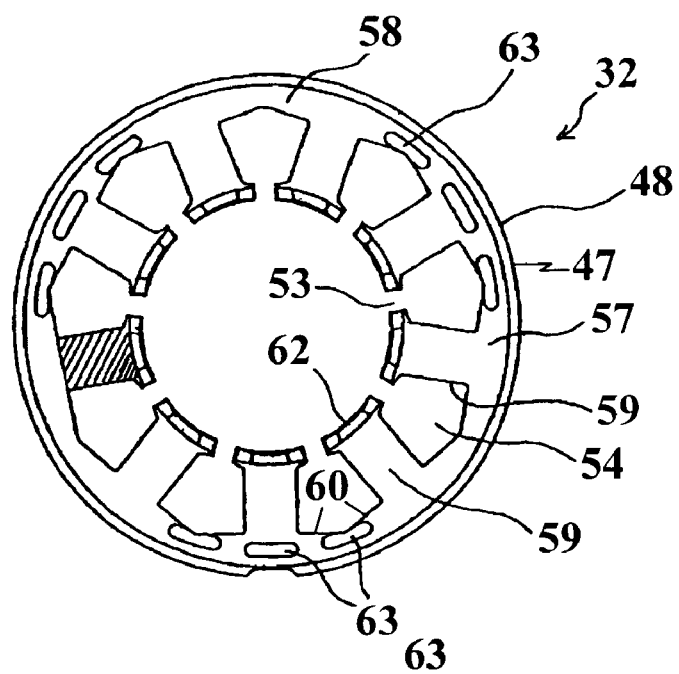
FIG. 5 is an end elevational view, in part similar to FIG. 2, but shows the construction with the insulator in place with one portion of the insulator shaded to show how the side of the insulator is configured to assist in the winding operation but again not showing the skewing of the pole teeth.
Figure 6:
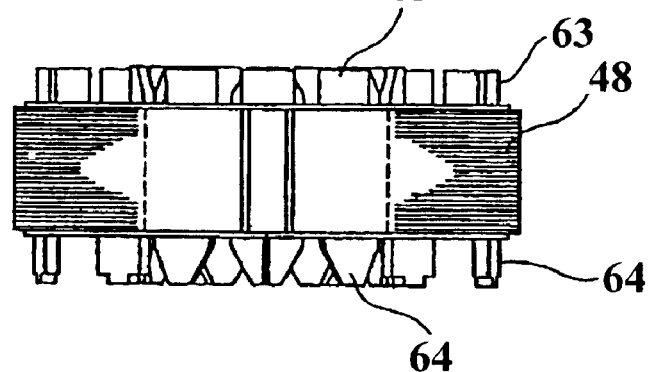
FIG. 6 is a side elevational view, in part similar to FIG. 3, but shows the core assembly with the insulator in place.
Figure 7:
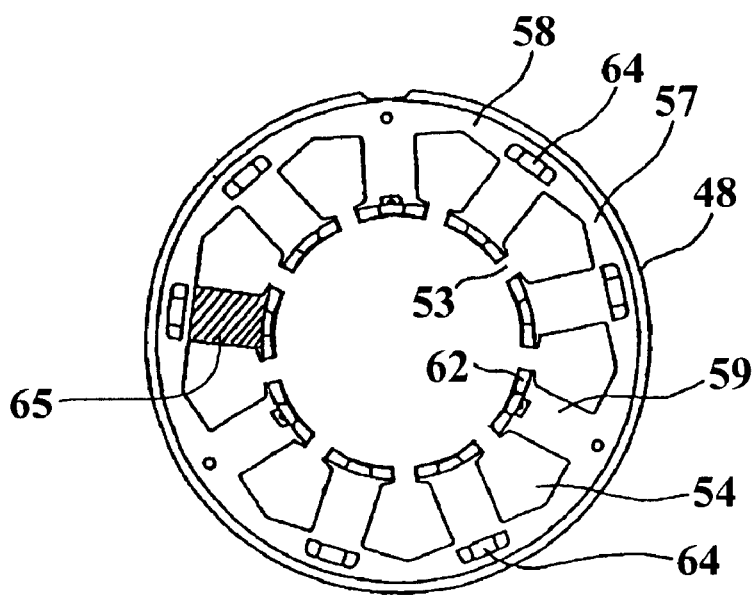
FIG. 7 is an end elevational view, in part similar to FIG. 4 looking in the opposite direction from FIG. 5 and showing one portion of the insulator shaded to show how the side of the insulator is tapered but again not showing the skewing of the pole teeth.
Figure 13:
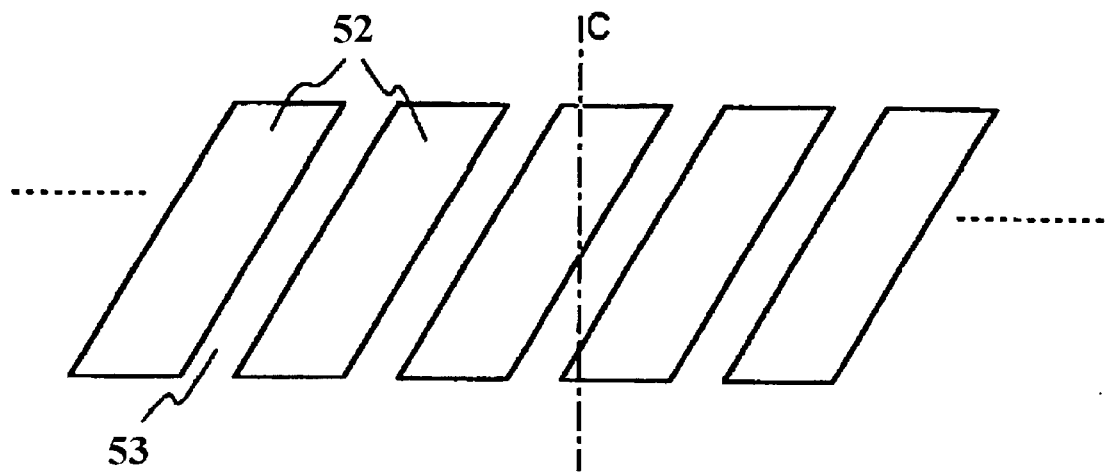
FIG. 13 is a developed view showing the actual skewing of the pole teeth and the slots between them.

As may be seen in FIGS. 5 through 7, the outer periphery of the circular portion 58 of the insulating bobbin forming member 57 extends to a lesser circumferential extent than the outer periphery of the circular portion 48 of the armature core 47.

Projections, indicated at 63, are formed at circumferentially spaced locations around the periphery of the insulating bobbin forming member 57, at least one of which is aligned with the insulator leg portion 59 and another of which is positioned adjacent the intersection between the inclined surfaces 60 as best shown in FIG. 5. This construction is formed at one side of the insulator on one of the insulating bobbin forming member 57a or 57b. The spacing of these projections is chosen in order to facilitate the passage of wires connecting the individual coils of the coil winding assembly 46. On the other side, there are similar further projections, indicated at 64, which may form a similar purpose.

\Special insulator inserts indicated by the reference numeral 65 are placed on the faces of the insulator legs 59 on one or preferably both of the insulators in the area between the respective arcuate portions 62 and further projections 63 and 64 thereon. These insulators are shown in lines in FIGS. 5 and 7 so as to indicate their relationship to the respective insulating bobbin forming member 57a or 57b.

The shape of these insulator inserts 65 is chosen so that they act as circumference changing devices for a purpose that will be described now by reference to FIGS. 8–12. A circumference changing member 65 according to the invention is used in place of the before-mentioned taper members 65. The circumference changing member 65 may be a separate member from the insulating bobbin forming members 57 or a member molded integrally therewith.

As shown best in FIG. 12, the circumference changing member 65 is chamfered as indicated at 65a at its opposite ends on the upper surface wherein the amount of this chamfering is gradually increasing from the positions of (a) through (k) toward the outer periphery. This gradually shortens the surface length of the circumference changing member 65 and accordingly the length or circumference around which each turn of the coil winding 46 makes progressing toward the tips of the pole teeth 51. This change in circumference is depicted graphically in FIG. 13.

Gradually shortening the circumference in such manner allows a drawing support point of the winding that is drawn out of the needle to be disposed on the outer periphery side and allows the winding to easily slide outward when the winding is wound around the inner periphery side. Therefore, the needle winding action outside of the slot 54 (out of the inner periphery side in this example) or adjacent the inlet of the slot 54 without inserting the needle into the slot 54 allows the winding to be wound on the magnetic pole tooth 51 to the bottom side of the slot 54. In this case, as to the needle winding action, it is desirable to increase the length of the loop to the extent of providing slack in the winding in order to carry out the winding action.

Thus, the drawing support point of the winding drawn out of the needle is located at the bottom of the slot to provide slack in the winding for the needle's winding action, which enables the winding to smoothly slide down to form the coil 46 on the magnetic pole tooth 51 while keeping the height of the circumference changing member 65 constant.

However the upper surface of the circumference changing member 65 may be inclined downwardly toward the bottom side as with the before-mentioned taper members 65. Forming such an inclined surface also enables the winding to slide down to the bottom side as described before. However, forming such an inclined surface makes the height of the circumference changing member on the inlet side of the slot greater, resulting in a large protrusion of the coil ends, and therefore, a greater profile thereof in the radial direction, as aforenoted. With respect to this, keeping the height constant as in the example shown in FIGS. 8–12 enables to obtain a stator with a compact profile.

It should be noted that the further projections 63 and 64 need not be formed at the base of each of the pole teeth 49 because of the inclined surfaces 60 formed thereat which will tend to preclude the wire from slipping down along the incline below that point. However, the further projections 63 form a further purpose than stopping the wire coils from slipping down beyond this point as will become apparent.

Figure 14:
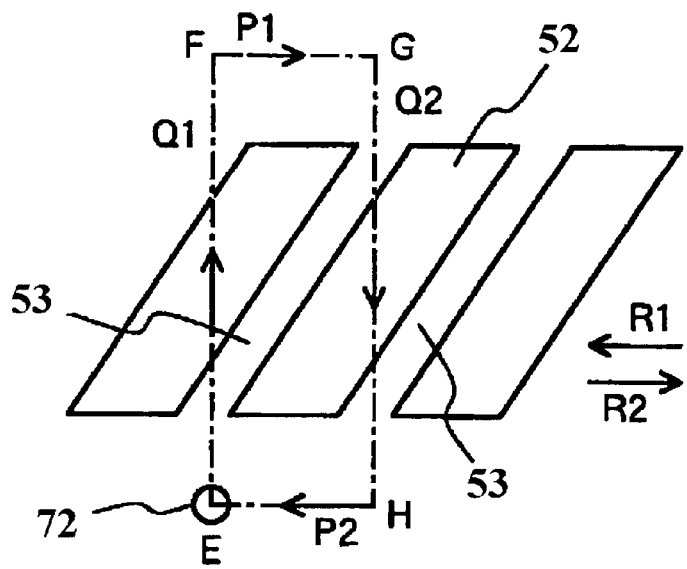
FIG. 14 is a view, in part similar to FIG. 13, and shows the path that the winding needle takes and the movement of the armature during the winding operation in accordance with a first embodiment of the invention.

The method by which the winding is accomplished may be best understood and will now be described by reference primarily to FIGS. 14 through 16. The winding apparatus, indicated generally at 70, (FIGS. 15 and 16) includes a needle carrier 71 that carries a winding needle 72 having a suitable configuration. The needle carrier 71 and needle 72 are formed with a wire guide opening 73 through which the individual enameled wire strand 69 passes from a feed roll (not shown). The path of wire travel is indicated by the arrows T in FIG. 16.

Figure 15:
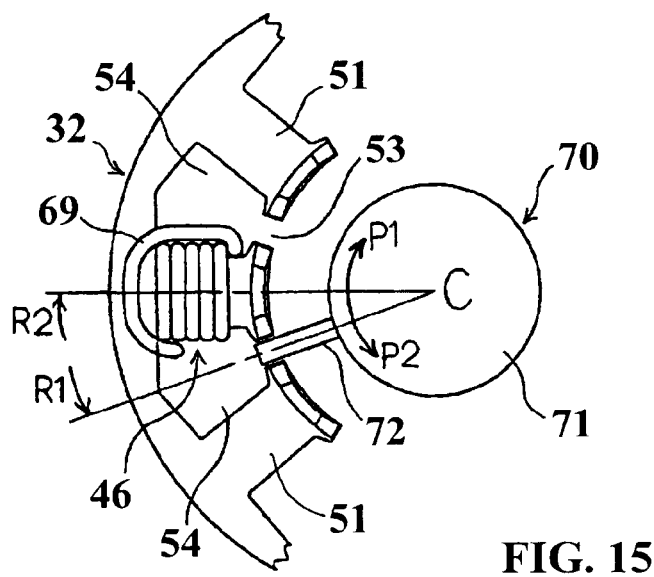
FIG. 15 is partial top plan view showing the actual configuration of the winding apparatus and the way that the motion shown in FIG. 14 is achieved.
Figure 16:
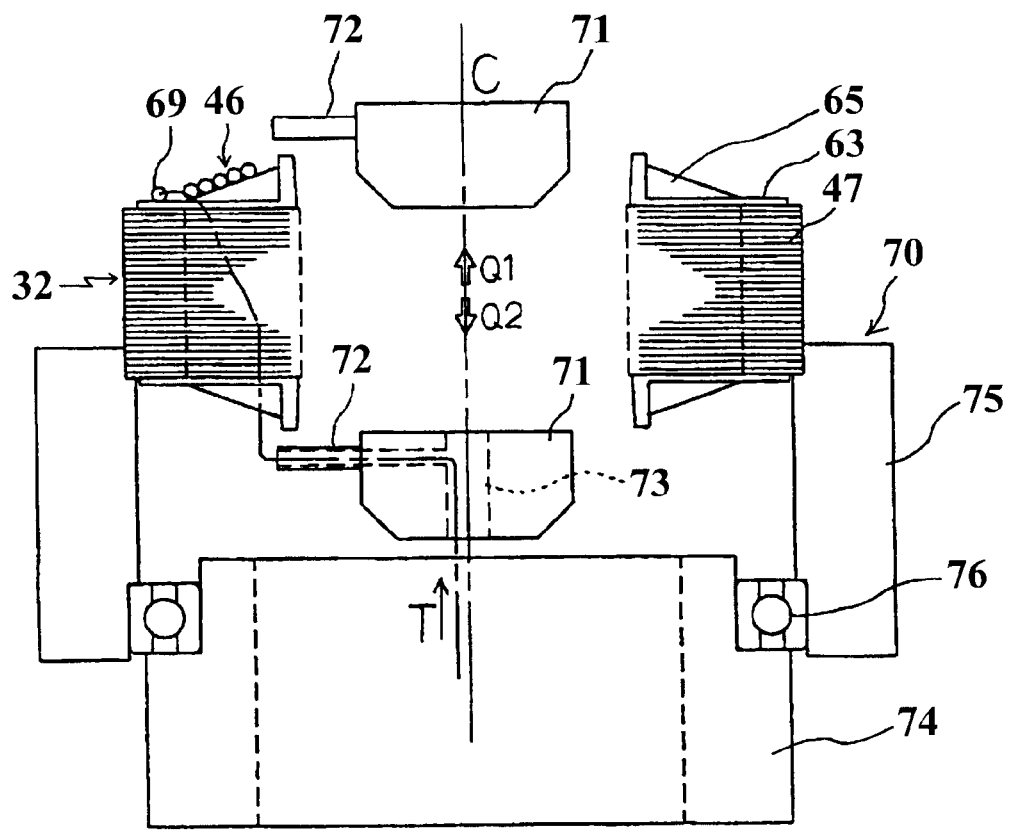
FIG. 16 is side elevational view in part in cross section showing the complete apparatus illustrated in FIG. 15.

As seen in FIGS. 15 and 16, the needle holder 71 and needle 72 reciprocate in a vertical direction (the direction of the rotor axis C) with respect to a base 74 as indicated by the arrows Q1 and Q2. The needle holder 71 and needle 72 also rotates about the rotor axis C as indicated by the arrows P1 and P2 and thus can move the needle 72 in a radial direction to the right and left (as seen the inner peripheral surface of the magnetic pole tooth 47 from front thereof). This movement is utilized to move the needle carrier 71 generally in a rectangular pattern around the individual pole teeth 49 and their overlying insulating bobbin forming members 57 through the path E, F, G and H as seen in FIG. 14.

However and as clearly seen from this figure, the skewing of the pole teeth 47 would cause the needle 72 to interfere with the pole teeth. To avoid this in this embodiment the armature 32 is supported for rotation about the rotor axis C. This rotation is shown by the arrows R1 and R2 in FIG. 15. This is accomplished by mounting the armature 32 on a chuck 75 that is journalled on the base 74 by bearings 76.

Thus the winding of the coils 46 is accomplished as follows. Initially, one end of the wire 69 is clamped by a clamp (not shown) at the position disposed radially outwardly beyond the end of the armature core 47 to form one end of one of the coil windings of the coil winding assembly 46. The needle is then moved radially along the tooth in the direction Q1 but in an area, which is disposed preferably slightly inwardly of the slots 54 between the teeth and on one axial side thereof. In this way, when the windings are formed, the bulging portion that overlies the wire end will not fill the slots 54 but will be positioned in an axial direction outwardly from these gaps and along one side face of the individual pole teeth 49.

To follow the skewed configuration of the pole teeth 47 the chuck 75 is rotated in the direction R1 during this movement of the needle 72. During winding, the needle 72 can either be radially positioned in the area immediately inside of the slot 54 in the area formed in the gaps 53 between the projecting ends 52 at the ends of the pole teeth 49, or radially inwardly of this area as long as during the winding operation the wire will contact the inner edge of the arcuate portion 62 of the insulating bobbin forming member 57. In no event, however, will the needle 72 enter deeply into the slot 54 and will always be positioned adjacent the gaps 53.

When the position F is reached (FIG. 14), the chuck 75 is held against rotation and the head 71 rotates the needle 72 in the direction P1 to the position G. The needle 72 is then returned in the direction Q2 to the position H while the chuck 75 is released and the armature 32 is rotated in the direction P2 to return to the point E.

As each winding is completed in this manner, the next winding will engage the previous winding and force it down the incline of the insulator insert 65 so that the wires will collect at the radial outer periphery of the slots 54. There the wire will be restrained by the inclined surfaces 60 of the insulating bobbin forming members 57. In the case of peripheral length changing members 65 each having a constant height as shown in FIG. 12 and by making the length of the winding drawn out by a loop action of the needle 72 larger than that of one turn of the coil 46 so that the winding may have some slack, the winding 69 is slid toward the root of the magnetic pole tooth 47 by an effect similar to a lasso effect.

Then, the next series of windings is made and is provided a very neat winding without bulges and which occupies substantially one half at the gap between the pole teeth 49 in the slots 54. This provides a very dense coil and insures maximum output of the machine.

In the embodiment of the invention thus far described, the winding needle 72 has been moved in rectangular path and the shape of the pole teeth 51 followed by rotating the armature 32 by means of the chuck 75. FIGS. 17 through 19 shows another embodiment of the invention wherein the armature 32 is not rotated.

Referring now to this embodiment, the winding head 71 is rotated in the direction P1, P2 during the movement of the head in the directions Q1 and Q2 so as to follow the skewed shape of the pole teeth 47 to establish the winding. The path of movement is shown in FIG. 17 and in this case the path forms the shape of a parallelogram having the corners or points J, K, L and M. Starting at the point J, the head 71 and needle 72 are moved in the direction Q1 and simultaneously rotation occurs around the axis C in the direction P1 until the point K is reached. Then, rotation occurs only in the direction P1 to move the nozzle 72 from the point K to the point L.

When the point L is reached, the nozzle is moved back in the direction Q2 and simultaneously rotated in the direction P2 until the point M is reached. Then, movement in the directions Q1 and Q2 is stopped and rotation occurs in the direction P2 to return to the point J. Winding then continues on this manner to complete the bobbin winding.

In the foregoing descriptions, a single winding needle had been described, but it should be readily apparent that the production can be improved by providing plurality of winding needles spaced at circumferential positions around the apparatus so that several windings can be completed simultaneously.

Thus, from the foregoing description it should be readily apparent that the described methods and apparatus are very effective in providing automatic machine winding of armatures having skewed pole teeth and maximum coil density can be obtained because the winding nozzle does not enter into the slots between the pole teeth. Of course, the foregoing description is that of preferred embodiments of the invention and various changes and modifications may be made without departing from the spirit and scope of the invention, as defined by the appended claims.

What is claimed is:

1. A method of winding the coils of a rotating electric machine comprising a circular core of a magnetic material and a plurality of magnetic pole teeth extending radially from the circular core wherein each of the magnetic pole teeth defining a core and slots formed between adjacent magnetic pole teeth, each of the slots defining a mouth formed between adjacent outer ends of the cores, said pole teeth and said slots being skewed relative to the axis of rotation of the rotating electric machine so that the slots and the pole teeth have the shape of a parallelogram in a developed plan view, said winding method comprising the steps of positioning a threading needle having an opening through which the wire for the winding the coils is fed in proximity to one of the mouths, effecting relative movement of the needle and pole tooth to effect movement of the needle opening in a skewed path relative to the pole tooth having the shape of a parallelogram around one of the pole teeth at one side of slot without moving the needle in any substantial distance along the length of the one pole tooth to form a first winding, and continuing the relative movement of the needle and pole tooth to effect movement of the needle opening in a skewed path around one of the pole teeth at one side of slot without moving the needle in any substantial distance along the length of the one pole tooth to form succeeding windings each of which moves the previous winding along the pole tooth toward the circular core without requiring movement of the needle in any substantial distance along the length of the one pole tooth so that the needle need not be moved any substantial distance into the slot.

2. A method of winding the coils of a rotating electric machine as set forth in claim 1, wherein the winding is continued until a winding is formed along substantially the full length of the pole tooth.

3. A method of winding the coils of a rotating electric machine as set forth in claim 2, wherein a second winding is subsequently layered over the previous winding in the same manner.

4. A method of winding the coils of a rotating electric machine as set forth in claim 1, wherein the needle opening is moved in a rectangular path and the pole tooth is rotated when the needle opening is moved along the sides of the pole tooth that define the slots on opposite sides thereof.

5. A method of winding the coils of a rotating electric machine as set forth in claim 1, the needle opening is moved in the path of a parallelogram spaced outwardly of the periphery of the pole tooth and the pole tooth is held against rotation during the winding.

6. An apparatus for winding the coils of a rotating electric machine comprising a circular core of a magnetic material and a plurality of magnetic pole teeth extending radially from the circular core wherein each of the magnetic pole teeth define a core and slots formed between adjacent magnetic pole teeth, each of the slots defining a mouth formed between adjacent outer ends of the cores, said pole teeth and said slots being skewed relative to the axis of rotation of the rotating electric machine so that the slots have the shape of a parallelogram in a developed plan view, said winding apparatus comprises a threading needle having an opening through which the wire for the winding the coils is fed in proximity to one of the mouths, a support supporting the circular core, said support and said winding needle being operated for effecting relative movement of the needle and pole tooth to effect movement of the needle opening in a skewed path relative to the pole tooth having the shape of a parallelogram around one of the pole teeth at one side of slot without moving the needle in any substantial distance along the length of the one pole tooth to form a first winding and continuing the relative movement of the needle and pole tooth to effect movement of the needle opening in a skewed path around one of the pole teeth at one side of slot without moving the needle in any substantial distance along the length of the one pole tooth to form succeeding windings each of which moves the previous winding along the pole tooth toward the circular core without requiring movement of the needle in any substantial distance along the length of the one pole tooth so that the needle need not be moved any substantial distance into the slot.

7. An apparatus for winding the coils of a rotating electric machine as set forth in claim 6, wherein the needle opening is moved in a rectangular path and the pole tooth is rotated when the needle opening is moved along the sides of the pole tooth that define the slots on opposite sides thereof.

8. An apparatus for winding the coils of a rotating electric machine as set forth in claim 6, wherein the needle opening is moved in the path of a parallelogram spaced outwardly of the periphery of the pole tooth and the pole tooth is held against rotation during the winding.

* * * * *